United States Patent [19]

Nussbaum

[11] Patent Number: 4,573,663

[45] Date of Patent: Mar. 4, 1986

[54] LIFTING DEVICE, ESPECIALLY ELEVATING PLATFORM FOR MOTOR VEHICLES

[75] Inventor: Hans Nussbaum, Bodersweier, Fed. Rep. of Germany

[73] Assignee: Hans Nussbaum, Kehl-Bodersweier, Fed. Rep. of Germany

[21] Appl. No.: 611,813

[22] Filed: May 18, 1984

[30] Foreign Application Priority Data

May 20, 1983 [DE] Fed. Rep. of Germany ....... 3318550

[51] Int. Cl.[4] ........................................ B60P 1/54

[52] U.S. Cl. ........................................ 254/89 H; 254/122

[58] Field of Search .................... 254/122, 9 C, 93 R, 254/89 H; 91/170 R; 92/181 P, 181 R

[56] References Cited

U.S. PATENT DOCUMENTS 1,880,650 10/1932 Zagst ............................ 92/181 R 3,246,876 4/1966 Larson ............................ 254/122

4,053,073 10/1977 Franchin ............................ 254/89 H

*Primary Examiner*—Robert C. Watson

*Attorney, Agent, or Firm*—Cushman, Darby & Cushman

[57] ABSTRACT

In a scissor-type lifting platform with two pairs of scissors disposed independently of one another, with hydraulic operation, a control cylinder is provided at one pair of scissors which is designed such that it produces the power required for the lifting of both pairs of scissors. A slave cylinder is series connected to said control cylinder at the second pair of scissors, which in the case of the lifting movement of the control cylinder is supplied with pressure medium. In this manner, a synchronization of the two pairs of scissors is achieved perforce and a mechanical connecting arrangement between the two pairs of scissors for the monitoring of synchronization may be eliminated.

3 Claims, 3 Drawing Figures

LIFTING DEVICE, ESPECIALLY ELEVATING PLATFORM FOR MOTOR VEHICLES

BACKGROUND OF THE INVENTION

The invention relates to a lifting arrangement, especially a lifting platform for motor vehicles.

For operating the scissors of the lifting platform according to a known arrangement, two pumps have been provided which are driven by a motor and each of which supplies a hydraulic cylinder with pressure medium which is assigned to one scissors of the lifting platform. In order to monitor the synchronization of the two pair of scissors, a cable is attached at the one pair of scissors movably by way of a spring and is coupled to the other pair of scissors. By way of a cam attached to a cable, it will be possible to operate a switch as soon as one of the two pairs of scissors leads or follows the other.

SUMMARY OF THE INVENTION

The present invention is based on the task of developing further a lifting arrangement of the initially stated type in such a way that a mechanical connection between the two pair of scissors may be eliminated.

As a result of the fact that the control cylinder is designed on the one pair of scissors for the operation of both pairs of scissors and the supply of pressure medium of a slave cylinder is accomplished at the other pair of scissors by a control cylinder, no mechanical connection is required for the synchronization of the two pairs of scissors between said scissors, since an adjusting movement at the control cylinder automatically results in a corresponding adjusting movement at the slave cylinder.

Further advantageous developments of the invention are presented in the following detailed description.

Two embodiments of the invention by way of example will be explained in more detail subsequently on the basis of the drawing.

Figure 1:
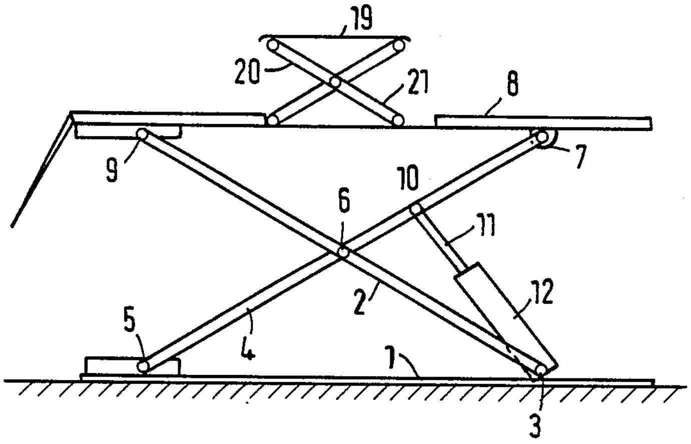
FIG. 1 shows schematically a side elevational view of an embodiment of the lifting platform.

In FIG. 1, the numeral 1 designates a base plate on which a guide lever 2 is articulated at 3 and guide lever 4 is guided horizontally shiftably at 5. The two guide levers 2 and 4 are connected at 6 articulately one with the other. At 7, the guide lever 4 is articulated to a rail 8, while the guide lever 2 is guided shiftably horizontally at 9. A control cylinder 12 developed as a differential pressure cylinder is articulated at the moving joint 3, the piston rod 11 of which engages at the guide lever 4. The distance at the point of the link of the piston rod 11 on the guide lever 4 from the linkage place 6 amounts to about one third of the distance between the points of linkage 6 and 7.

The control cylinder 12 may be disposed beside the guide levers 2, 4, preferably however the guide levers 2, 4 are formed always by two flat guide levers lying at a distance from one another, so that the cylinder 12 may be disposed between these flat guide levers.

FIG. 1 merely shows one of the two pairs of scissors which, in practice, are disposed in parallel beside one another and which cooperate to provide a lifting platform. The other pair of scissors is developed in the same manner, and the hydraulic cylinder provided for its operation is disposed in the same manner. By action of pressure on the cylinders, the scissors—as shown—are opened and the rail 8 is lifted. The two pairs of scissors are disposed completely independently of one another; also a base plate 1 may be provided separately for each pair of scissors.

For the operation of the two pairs of scissors, a single pump 13 (FIG. 2) has been provided which is driven by a motor 14, which may be controlled by a motor reversing switch, not shown, in such a way that it revolves in the one or the other rotational direction. The pump 13 has been connected on the piston side by way of a magnetic valve 15 to the control cylinder 12, the piston surface of which is designed such that the force required for the lifting of both pairs of scissors can be produced by the control cylinder 12 alone. As a result of the piston rod 11 of the control cylinder 12, the pair of scissors represented in FIG. 1 are lifted and lowered directly, while the second, identical pair of scissors, but in the starting position which has not been shown, is operated by a slave cylinder 16 which is disposed in the same manner as the control cylinder 12 in FIG. 1. The two cylinders are interconnected by a line 17 which is connected at the control cylinder 12 on the side of the piston rod 11 and ends at the slave cylinder 16 on the piston side. The piston ring surface (piston surface less the cross sectional surface of the piston rod 11) at the control cylinder 12 corresponds to the piston surface on the slave cylinder 16. In the case of the shifting movement of the piston rod 11 at the control cylinder 12, pressure medium is supplied by way of line 17 to the slave cylinder 16 so that the latter may execute its lifting function. For lowering the lifting platform, the pump 13 is reversed by way of the motor reversing switch so that the pressure medium is drawn out of the control cylinder 12 and pressure medium is drawn off in a corresponding manner from the slave cylinder 16 into the annular space of the control cylinder 12 surrounding the piston rod 11.

Figure 2:
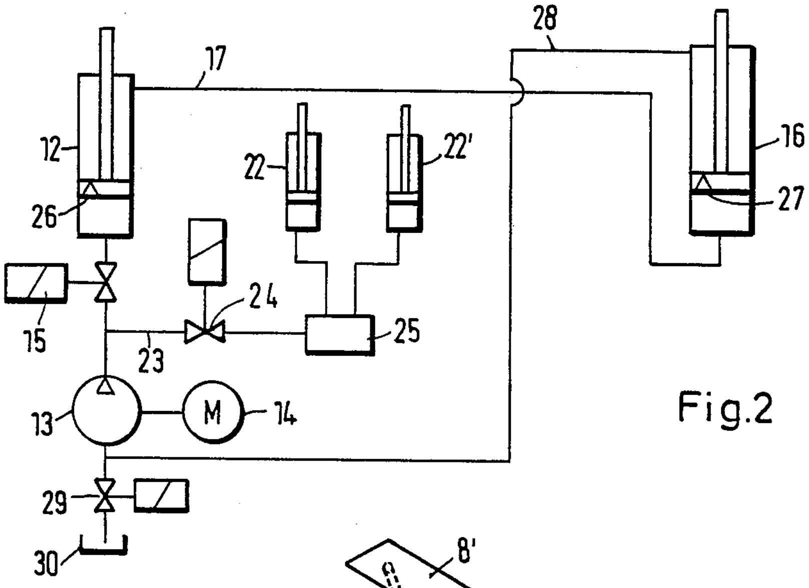
FIG. 2 is a schematic presentation of the hydraulic operating arrangement of the lifting platform according to FIG. 1 in flowsheet form and FIG. 3 is a schematic perspective view of another embodiment of the lifting platform.
Figure 3:
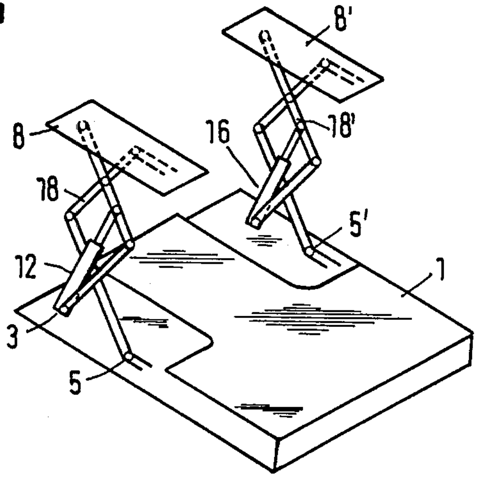

The hydraulic coupling at the outlet side of the slave cylinder 16 behind the control cylinder 12 ensures a synchronization of the two pairs of scissors without that any mechanical connecting arrangement is required. The hydraulic operating arrangement described is usable just as in the case of a multiple scissors arrangement according to FIG. 3. The cylinders 12, 16, just as in the case of the previously described single-pivot scissors, may engage at the shiftably guided joints 5, as had also been described in the original application and the application of addition, but even in the case of the embodiment according to FIG. 3, the cylinders 12, 16 are disposed preferably in the plane of the scissors (standing in an extended position). As FIG. 3 shows, the piston rod of the cylinders articulated to the fixed joining point 3 engages at the guide lever 18 of the second pair of scissors of a scissors arrangement, whereby the articulating place of the piston rod lies in the lower third of the lever length. Also in the case of this type of construction, preferably individual guide levers formed from flat guide levers lying in parallel to one another are used, as is shown in FIG. 2 of the application of addition No. P 32 48 414, so that the operating cylinders may be disposed between the flat guide levers.

In FIG. 1, a platform 19 is developed in the middle of the rail 8 which constitutes a part of the surface of the rail and may be lifted and lowered by a scissors 20, 21 in relation to the rail 8. This scissors 20, 21 is developed in the same manner as the scissors 2, 4 and it is operated by a cylinder 22, not shown in FIG. 1. This lifting arrangement integrated in rail 8 serves as a free lifting arrangement for the wheel for a vehicle disposed on the rail. Such a free lifter of the wheel is provided on each of the two rails and it may be operated independently of the lifting position of the rail 8 in order to lift off a vehicles disposed on the rail from said rails.

The operating cylinders 22 and 22' of the two free lifters of the wheel are supplied with pressure agents from the pump 13 by way of a line 23 in which a magnetic valve 24 has been disposed. In the case of standard operation of the lifting platform, the magnetic valve 24 is closed and the magnetic valve 15 is opened. In order to operate the free lifter of the wheel 19–21, an additional motor reversing switch is provided on a control board, not shown. Whenever said switch is operated, then as a result of an electric circuit, not shown, the magnetic valve 15 is closed and the magnetic valve 24 is opened. The motor 15 is put into rotation in the lifting and lowering direction by way of the second motor reversing switch for the wheel-free lifter. Thus, it will only be possible in the case of rails 8 standing still to operate the wheel free lifters disposed thereon.

In the line 23 a dynamic quantity divider 25 is disposed which distributes the quantity of pressure agent fed in over the line 23 to the two operating cylinders 22, 22'. For the wheel free lifters 19–21, a monitoring arrangement for the synchonization is not required because of the insignificant height of the lift in relation to the rails 8. The operating cylinders 22, 22' disposed in the rails 8 are provided with pressure medium by way of a flexible line which is guided to the rail by way of the guide levers 2, 4. In the case of this arrangement, too, the operating cylinders may be disposed between the flat guide levers.

In the piston of the control cylinder 12, an overflow or a clutch valve 26 has been disposed which serves for the compensation of the leakage. This overflow valve 26 permits a throughflow of the pressure medium from the front side of the piston to the side of the piston rod 11 in order to fill up again the volume of pressure medium between the control cylinder 12 and the slave cylinder 16 in case that leakages occur. In the counter-direction, the overflow valve 26 permits no throughflow.

Between the pump 13 and the control cylinder 12, a hydraulically unblockable clutch valve may be provided by means of which the achieved lifting position is fixed. The circuit of such a hydraulically unblockable clutch valve is shown in German OS No. 29 43 370.

In the case of the embodiment by way of example shown in FIG. 2, likewise an overflow or clutch valve 27 is provided in the piston of the slave cylinder 16 which clutch valve permits a throughflow from the forward side of the piston onto the reverse side of the piston, but locks it in the opposite direction. On the side of the piston rod, a line 28 meets the slave cylinder 16 which line is connected with the run-off side of the pump 13. The numeral 29 designates a magnetic valve between the pump 13 and the reservoir 30. In the case of lifting operations, the magnetic valve 29 is opened and the pump 13 supplies pressure medium into the control cylinder 12 which, in turn, forces pressure medium into the slave cylinder 16. On the side of the piston rod of the slave cylinder 16, pressure medium is moved thereby by way of the line 28 into the reservoir 30. Whenever the piston of the control cylinder 12 and thus also the slave cylinder 16 reaches its end position, then it will be possible that a certain throughflow by way of the overflow valves 26, 27 takes place from the pump 13 through the two cylinders to the reservoir 30. This throughflow may be used for ventilation.

For the purpose of lowering, the motor reversing switch, not shown, is reversed, whereby the magnetic valve 29 is closed and pressure medium in the case of a reverse rotational direction of the pump is introduced by way of line 28 to the secondary side of the slave cylinder 16. The lifting movement in the slave cylinder 16 leads to a synchronized shifting movement of the piston in the control cylinder 12 during the lowering of the lifting platform. At the same time it is possible to connect the line provided between the pump 13 and the control cylinder 12 by way of an additional magnetic valve, not shown, with the reservoir 30.

I claim:

1. A device for elevating an automobile, comprising:
a base plate means;
two laterally spaced scissors-type hydraulic jacks mounted to said base plate means;
each said hydraulic jack including a platform constructed and arranged to cooperate with the said platform of the other respective hydraulic jack to support an automobile;
each said hydraulic jack further including a scissors mechanism having two pivotally connected scissor elements with two respective lower ends and two respective upper ends;
each said hydraulic jack having said lower end of one of said two pivotally connected scissor elements thereof pivotally but non-slidably connected to said base plate means, and said upper end thereof both pivotally and slidably connected to the respective said platform;
each said hydraulic jack further having said lower end of the other of said two pivotally connected scissor elements thereof both pivotally and slidably connected to said base plate means, and said upper end thereof pivotally but non-slidably connected to the respective said platform;
pivotal connections of said scissors elements to one another, and of each said pivot element to said base plate means and the respective said platform being about respective generally horizontal axes extending laterally of said device, so that as each said platform is raised and lowered, on each said hydraulic jack the respective scissor element lower ends move towards and away from one another, the respective scissor element upper ends move towards and away from one another, and both scissor element upper ends move away from and towards both scissor element lower ends;
a first extensible/retractable hydraulic piston and cylinder arrangement connected with one of said hydraulic jacks for raising and lowering the respective said platform by pivoting and sliding respective of said pivotal connections of that hydraulic jack; a second extensible/retractable hydraulic piston and cylinder arrangement connected with the other of said hydraulic jacks for raising and lowering the respective said platform by pivoting and sliding respective of said pivotal connections of that hydraulic jack;
a hydraulic pump;

valved hydraulic line means interconnecting said first and second hydraulic piston and cylinder arrangements and said pump, said valved hydraulic line means being constructed and arranged to correspondingly extend and retract said first and second extensible/retractable hydraulic piston and cylinder arrangements by substantially equivalent amounts so that said platforms will remain substantially level with one another as both are raised and lowered, without a need for mechanical interconnection of said hydraulic jacks above said base plate means, apart from such automobile as is supported thereon in use;

said device being characterized by a lack of interconnecting framework between said hydraulic jacks above said base plate means.

2. The device of claim 1, further comprising:

an auxiliary scissors-type hydraulic jack based on each said platform, each said auxiliary scissors-type hydraulic jack including an auxiliary scissors mechanism, an auxiliary platform mounted on such auxiliary scissors mechanism, and a hydraulically-powered auxiliary extensible/retractable piston and cylinder arrangement constructed and arranged for operating the respective auxiliary scissors mechanism for raising and lowering the respective said auxiliary platform relative to the respective said platform; and valved hydraulic power means communicated to said auxiliary extensible/retractable piston and cylinder arrangements in such a sense as to permit said auxiliary platforms to be raised and lowered separately from one another.

3. The device of claim 2, wherein:

said valved hydraulic power means is incorporated in said valved hydraulic line means for powering by said hydraulic pump.

* * * * *